United States Patent Office 2,763,580
Patented Sept. 18, 1956

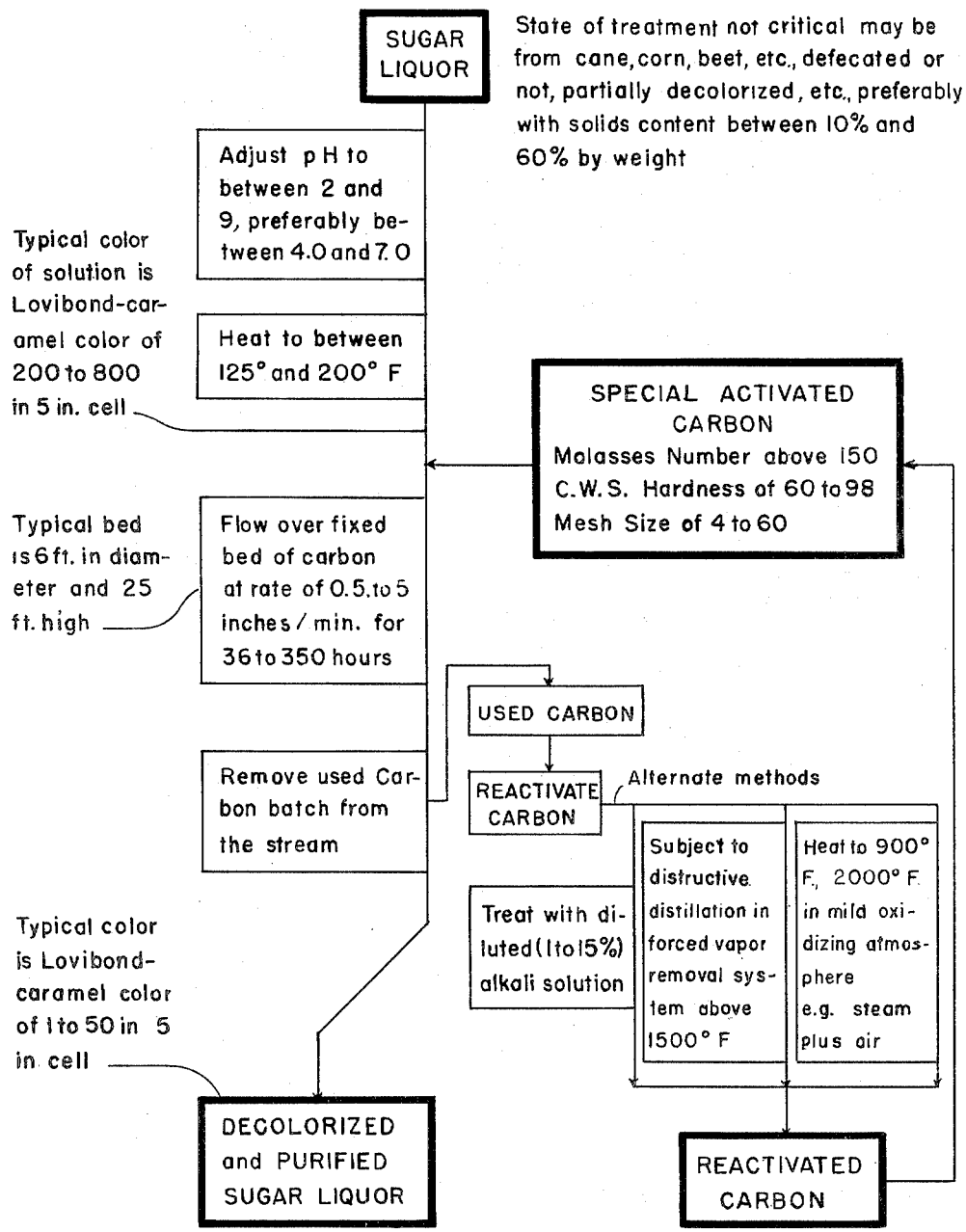

2,763,580

ACTIVATED CARBON TREATMENT OF SUGAR LIQUORS AND REGENERATION

John William Zabor, Pittsburgh, Pa., assignor to Pittsburgh Coke & Chemical Company, Pittsburgh, Pa., a corporation of Pennsylvania Application January 29, 1951, Serial No. 208,384

5 Claims. (Cl. 127—55)

This invention relates to the treatment of sugar liquors. More particularly, it is concerned with the simultaneous decolorization and purification of sugar liquors by a continuous process yielding sugar solutions of excellent color properties which are substantially free of hydroxymethyl furfural or similar contaminating materials which are unusually difficult to separate from sugar solutions and which cause discoloration problems.

*Field of invention*

The treatment of sugar liquors is one of the oldest of the established industrial chemical procedures and, consequently, it is a very highly developed art. Still, extensive time and money are spent each year on research and development work designed to improve existing procedures in this field. A large percentage of such research and development is concerned with improving procedures for the decolorization of sugar liquors.

Many agents have been suggested from time to time as reagents in aiding or modifying procedures for the decolorization of sugar liquors and one of the most historic of these types of products is bone char. This product is used primarily as a decolorizing agent for previously defecated sugar liquors, but it also acts as a defecator and removes some of the ash-bearing ingredients of the liquors. Nevertheless, bone char possesses a number of disadvantages which make it far from an ideal sugar liquor treating agent. For example, the usable life of bone char in such procedures is relatively short and it does not remove a number of troublesome impurities or contaminating ingredients present in sugar liquors, such as hydroxymethyl furfural, and some of its polymers, which occur rather widely, particularly in corn sugar liquors, and are responsible for subsequent development of a large percentage of the color present in these solutions. Because of the short life cycle and the relatively low adsorptive capacity of bone char, the cost of treating sugar liquors by known procedures is higher than desired, e. g., a large amount of heat and water are used, due to the number of changes in filter units and other apparatus which are necessary in the so-called "sweetening-off," steaming, drying and reactivation procedures.

With these deficiencies associated with bone char in mind, the trade has attempted to find suitable substitutes for bone char which might be used to partially or totally replace this material. Activated carbon in various forms has been suggested and tried on numerous occasions and present procedures for treatment of sugar liquors generally employ certain stages which use pulverized activated carbon as an established reagent. However, granular activated carbon has not been used in the past, in commercial operations, to replace bone char as a decolorizing agent. Also, activated carbon procedures known heretofore have themselves been associated with certain disadvantages. For example, the majority of known procedures which utilize activated carbon employ the so-called "contact" process in which very finely divided activated carbon is suspended or dispersed in the sugar liquor during treatment and is then removed by filtration after it has served its purpose, adding to the already troublesome filtration problems. Furthermore, reactivation of the used activated carbon has always been difficult and in cases impossible, thus contributing to the increased cost of operation.

*Objects*

A principal object of the present invention is the provision of a new process for the simultaneous decolorization and purification of sugar liquors, so as to produce sugar liquors of relatively high purity and freedom from color and which are substantially free of relatively low molecular weight impurities, such as hydroxymethyl furfural or related color-causing materials. Still further objects include:

(1) The provision of new continuous procedures for the simultaneous decolorization and purification of sugar liquors.

(2) The provision of such procedures in which the sugar liquors are substantially freed of hydroxymethyl furfural and related relatively low molecular weight impurities.

(3) The provision of such operations which may be run over relatively longer periods of time before the decolorizing agents must be replaced by new quantities thereof, whereby substantial savings in heat may be obtained due to the need for less frequent changes of reagents and less down-time, due to "sweetening-off" steps and allied reactivation steps.

(4) The provision of such sugar manufacturing operations in which decolorizing agents are used which may be regenerated in a number of different ways, both separately or in conjunction with one another, thus providing greater flexibility in the manufacturing operations.

(5) The provision of such operations in which a fixed bed of decolorizing agent is employed as contrasted to the so-called "contact" process.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

*General description*

These objects are accomplished according to the present invention by the simultaneous decolorization and purification of sugar liquors by passing the sugar liquor through a bed of activated carbon particles which are substantially of a size between 4 and 60 mesh, have a molasses number of at least 150, and preferably, between 150 and 400, and a C. W. S. hardness number of between 60 and 98. Preferably, the passage of sugar liquor through the fixed bed of activated carbon granules is accomplished at a temperature of between 125 and 200° F., using an apparent liquor flow velocity corresponding to between about 0.5 and 5 inches per minute. The passage of the sugar liquor is continued until the emerging treated liquor possesses a poorer color or analysis than the desired standard, or until after a predetermined lapse of time, after which the used bed of carbon is replaced with a new bed of new or reactivated carbon and the carbon in the used bed is reactivated. Advantageously, this total "on stream" time for each portion of carbon is generally between 36 and 350 hours.

The success of the present invention is due to a large extent to the discovery that there is a critical difference in the results which can be obtained with different activated carbons in the treatment of sugar liquors. As a matter of fact, it has been surprisingly discovered that activated carbons of the type specifically defined above operate considerably differently than other activated carbons which have been used heretofore in the treatment of sugar liquors. One distinction is that the sugar liquors are treated, according to the new procedures, using a fixed bed of carbon, instead of a "contact" process. Likewise, in contrast to known prior art methods, using granular absorbents, hydroxymethyl furfural and related materials of relatively low molecular weight, which are potent color-causing agents, are substantially completely removed by the new operations.

*Flow diagram*

The sheet of drawing, attached hereto, constitutes a flow diagram of the procedures as encompassed by this invention and when used in conjunction with the description given in this specification, will enable the reader to more easily comprehend the new procedures. It will be understood that the diagram is illustrative and that only usable modifications have been indicated therein in order not to confuse the reader. For example, the carbon beds may be of any desired size and the reactivation steps used in sequences of two or more.

*Example*

A more complete understanding of the new procedures of the present invention may be had by reference to the following example which sets forth details of actual operation for decolorization of sugar solutions obtained from corn.

A sugar liquor having a density of 28° to 30° Bé. (55.5% solids by weight), obtained from corn starch hydrolyzate and a Lovibond-caramel color of 200 to 800 units in a 5 inch cell, is used. The sugar liquor is taken from the plate and frame filter following a normal vacuum evaporator operation.

The treatment is carried out, using three activated carbon filtering beds connected in tandem. In a normally operating system, each bed is formed of activated carbon having an average particle size distribution of about 8 by 30 mesh and a C. W. S. hardness number of about 80. This carbon is charged into vessels substantially cylindrical in shape, which measure approximately six feet in diameter, stand twenty-five feet high and have a suitable fluid inlet and fluid outlet. The carbon is charged into the filtering vessel over a cocoanut fibre mat base to a depth of about twenty feet.

When the process is first started, each filtering vessel is charged with a fresh batch of activated carbon or reactivated carbon. However, once normal operating conditions are established, this does not take place again and, as will become apparent from the further description of the operation, only one filter bed in the series is generally changed at any one time as this becomes necessary.

The sugar solution above mentioned is heated to a temperature of about 160° F. and is passed into the first filter unit in the series at an average rate of about 66 gallons a minute, which corresponds to an apparent fluid flow of about 3.7 inches per minute through the activated carbon bed. The partially treated liquor emerging from the first filter is passed into the second filter unit and, in turn, the effluent from this unit is passed through the third unit.

The operation is continued for about 100 hours, during which time the color of the liquor effluent from the third filter unit increases from an original color of 1 to 50 Lovibond-caramel color in a 5 inch cell. At the end of this time, the upstream filter unit is removed from the series and a comparable unit charged with new carbon, as before described, is connected into the filter series as the last downstream filter in the series and the two remaining filters are moved to the next position upstream.

The filter removed after a total "on stream" time of 300 hours from the group is treated with hot water to "sweeten-off" the unit and recover the sugar values contained therein in known fashion. After the bed of carbon has been sufficiently washed, it is treated with superheated steam to remove the water therefrom. When the carbon has assumed a free-flowing state, it is discharged from the filter vessel and conveyed to a drier and thence to a reactivating kiln. Here, it is subjected to an atmosphere of steam which has been super-heated to about 1800° F. and which contains approximately 0.5% oxygen introduced into the steam in the form of air. The carbon is treated in this manner for about two hours, after which it is substantially reactivated and is then allowed to cool. The carbon so regenerated is substantially equivalent to new carbon and is ready for reuse.

After the sugar treatment has run for another period of about 100 hours, the upstream filter unit in the series is disconnected and a new filter charged with reactivated carbon is inserted in the series as the downstream unit and the sugar liquor operation is continued.

Operating in this fashion, it is found possible to continue the treatment of partial defection and decolorization of the sugar liquor, using the original quantity of activated carbon plus an additional 1.5% for each cycle of the operation to replace losses due to handling and destruction by reactivation.

*Detailed description*

The procedures of the present invention are generally applicable to the treatment of all types of sugar liquors. Thus, the new operations may be used with cane, beet, corn, or any other known type sugars. Removal of color-forming bodies and impurities from corn sugar solutions has been extremely troublesome in the past, due to contamination with such materials as hydroxymethyl furfural, and the present operations are particularly useful in connection with this type of product.

The nature of the sugar solutions treated is not critical and various concentrations and the like of sugar solutions can be employed, although equally good results are not obtained with all possible solutions. Most satisfactory results are obtained with sugar liquors having a solids content of between 10 and 60% by weight, and especially sugar solutions having a solids content of 20 to 56% by weight. Although complete raw sugar solutions may be treated, it is preferable to employ sugar liquors which have been partially defecated by other agents, such as lime-phosphate, or by other known methods. Similarly, sugar solutions of various characteristics may be employed, although it is desirable to observe certain limits on pH and ash content of the liquors. Most satisfactory results are obtained using liquors having a pH between 2 and 9 and especially 4.0 and 7.0. Where desirable, partial treatment may be carried out at one concentration or condition, after which the treatment can be completed at a higher concentration (obtained by evaporation) or other condition.

Various conditions may be employed in treating the sugar liquors in accordance with the new procedures, although for most satisfactory results, certain limits on conditions should be observed. Thus, preferably, the sugar liquors should be heated to a temperature between 125 and 200° F. before contact with the bed of activated carbon. Similarly, various rates of flow of the liquor through the bed can be used, but an apparent rate of flow between 0.5 and 5 inches per minute is preferred.

The length of time between initial contact of the carbon with the sugar liquor and reactivation of the carbon is not critical, and this time will depend to a large extent upon the color content of the original sugar liquor, the desired decolorization and the rate of passage of the sugar liquor through the bed. However, under normal conditions, the "on stream" time for each carbon portion is of between 24 and 350 hours, and especially between 36 and 200 hours. This aspect of the present invention is particularly important since the relatively long length of cycles of treatment, made possible by this invention, greatly reduces cost of operation by saving heat necessary to reactivate carbon and to heat up and evaporate large quantities of liquid. It also decreases the "down-time" of the purification equipment, thus increasing the capacity of this section of the plant.

The activated carbon used in accordance with this invention is critical and if the unique results discussed herein are to be obtained, a carbon of particular properties must be employed. Thus, the carbon must be granular in form and of average size between 4 and 60 mesh (standard sieve). Also, the carbon must have a particular hardness which, on the C. W. S. scale, is between 60 and 98, and a molasses number of at least 150. A mesh size of between 8 and 30 and a molasses number between 150 and 400 are preferred.

The carbon is held during use in suitable vessels to form the treating beds. Separate beds in series or in tandem are generally used rather than one large bed for obvious mechanical reasons.

The carbon used in the activated carbon may be obtained from various sources, preferably, petroleum coke or coal. Where the petroleum coke variety is employed, the coke having a mesh size of 4 to 30 mesh is used and is activated in an atmosphere of flue gas enriched with steam by heating to a temperature of 1500 to 2000° F. or by other suitable activating conditions known to the art.

Where a coal base carbon is employed, the coal is pulverized, formed into briquettes under pressure, the briquettes are then crushed to a mesh size of 4 to 30, heated in an oxidizing atmosphere below 600° F. devolatilized by heating in an atmosphere of steam at temperatures gradually rising to 900° to 1200° F., and finally activated in an atmosphere of flue gas enriched with steam or steam alone at a temperature of 1500 to 2000° F.

Various methods can be used for the reactivation of used carbon in accordance with this invention. Thus, the carbon can be reactivated by treatment with alkali solutions, by destructive distillation or by mild oxidation at elevated temperatures or any combination of these, e. g., one method followed by another in the same or after several cycles.

Alkali reactivation is accomplished simply by passing a solution of sodium hydroxide or potassium hydroxide through the carbon bed until the tested activity of the carbon no longer increases appreciably. Alkali solutions of between 1 and 15% solids content and, preferably, between 3 and 10% are employed. Various treatment temperatures can be used, such as 20 to 200° F. This method may be used in conjunction with any of the other reactivation methods.

Reactivation by destructive distillation is accomplished by charging suitable heating equipment with the carbon and then heating the carbon in an inert atmosphere to a temperature where the absorbent materials on the carbon distill off through a forced vapor removal system. A high temperature, preferably above 1500° F., should be used for efficient reactivation.

The preferred method of reactivation is to heat the carbon in a mildly oxidizing atmosphere. The oxidizing nature of the atmosphere to the carbon will depend to a large extent upon the temperature of treatment which should be at a temperature between 900 and 2000° F. At the lower temperature, the atmosphere may contain as much as 20% oxygen, while at the higher temperture, 0.1% or less oxygen may be used. Mixtures of steam and air are preferably employed at the lower temperatures, whereas mixtures of steam and carbon dioxide or flue gas are used at the higher temperatures.

*Determination of critical values*

In the above discussion, reference is made to certain critical values. The methods for their determination are discussed below.

The carbon hardness is determined according to the Standard Chemical Warfare Service Method, described in C. W. S. pamphlet No. 2, on "Canister and Absorbent Test Method." The test is conducted by weighing out 50 grams of 12 to 16 mesh size carbon and placing it in a hardness test pan with fifteen ½-inch and fifteen ⅜-inch smooth steel balls. The testing pan is covered and then placed in a standard vibrating machine and shaken for 30 minutes. At the end of 30 minutes, all the carbon in the pan is brushed out onto a number 20 sieve and this is shaken on the vibrating machine for exactly 3 minutes. The weight of carbon remaining in the number 20 sieve multiplied by two gives the hardness number.

Mesh size of the carbon is measured by a standard sieve method by weighing 100 grams of material into the top sieve of a standard U. S. sieve series and then vibrating the series of sieves for 3 minutes. The carbon retained on each sieve is then weighed (in grams) and recorded as the percentage retained.

Molasses number, as described above, is determined by comparing the decolorizing ability of the carbon under test with a standard carbon on a standard Cuban black strap molasses, according to the method described in the book by J. W. Hassler, entitled "Active Carbon, the Modern Purifier," pages 90 to 91. The standard sugar solution is diluted to about 5% solids content and mixed with about 0.5% of diatomaceous earth which is then removed by a vacuum filter. 0.92 gram portions of a standard carbon having a molasses number of 400 and of the carbon to be tested are weighed into 150 cc. beakers. 100 cc. of the filtered molasses is added to each carbon, the mixtures are thoroughly stirred and heated to boiling. The boiling mixture is removed from the heat source, stirred for 10 seconds and filtered through fluted filter paper on stemless funnels into 150 cc. beakers. A comparison is then made on a Campbell-Hurley colorimeter between the colors of the two filtrates and the ratio of depths of unknown and standard solutions giving equal light transmission times 400 gives the molasses number.

*Conclusions*

The above described invention provides a new method for the simultaneous decolorization and purification of sugar liquors which is capable of removing not only the higher molecular weight and more easily removed impurities, but also the difficultly removed impurities, such as hydroxymethyl furfural. The new processes are generally applicable to all types of sugar liquors, although it is especially useful in the treatment of corn starch hydrolyzates. They are characterized not only by completeness of removal of impurities, but also by the long length of time in operation cycles which can be employed, which permit large savings in cost, because of reduction of heat consumption, labor expenditure and elimination of waste of treating reagents and desired products.

I claim:

1. A process for the purification and decolorization of sugar liquors which comprises passing an aqueous sugar liquor having a solids content of at least 10% by weight and at a temperature above about 125° F. through a bed of granular activated carbon of particle size between 4 and 60 mesh for a time sufficient to purify and decolorize the liquor, said carbon particles having a C. W. S. hardness number between 60 and 98 and a molasses number between 150 and 400, said carbon being selected from the group consisting of (1) a carbon activated by heating petroleum coke in an atmosphere of flue gas enriched with steam at a temperature of 1500° to 2000° F. and (2) a carbon activated by heating a coal in an oxidizing atmosphere below 600° F., devolatilizing by heating at temperatures gradually rising to between 900° and 1200° F. and finally activating in an atmosphere consisting essentially of steam at a temperature of 1500° to 2000° F., and regenerating said carbon for reuse by heating the same in an oxidizing atmosphere at a temperature between about 900° and about 2000° F.

2. A process according to claim 1 wherein said carbon is prepared from a coal and is finally activated in an atmosphere of steam alone.

3. A process according to claim 1 wherein said carbon is prepared from a coal and is finally activated in an atmosphere of steam and flue gas.

4. A process according to claim 1 wherein the carbon is activated by heating petroleum coke in an atmosphere of flue gas enriched with steam at a temperature of 1500° to 2000° F.

5. A process according to claim 1 wherein the carbon is activated by heating a coal in an oxidizing atmosphere below 600° F., devolatilizing by heating at temperatures gradually rising to between 900° and 1200° F. and finally activating in an atmosphere consisting essentially of steam at a temperature of 1500° to 2000° F.

References Cited in the file of this patent

UNITED STATES PATENTS

| | | |
|---|---|---|
| 2,388,222 | Behrman | Oct. 30, 1945 |

FOREIGN PATENTS

| | | |
|---|---|---|
| 62,606 | Netherlands | Mar. 15, 1949 |
| 322,135 | Germany | June 17, 1920 |
| 228,582 | Great Britain | Feb. 9, 1925 |
| 273,761 | Great Britain | Sept. 27, 1928 |
| 597,332 | Great Britain | Jan. 23, 1948 |
| 628,599 | France | July 4, 1927 |
| 638,492 | Great Britain | June 7, 1950 |
| 641,992 | Great Britain | Aug. 23, 1950 |

OTHER REFERENCES

Hassler: "Active Carbon," W. Va. Pulp & Paper Co., 1941, page 59.